(12) United States Patent
Tabata et al.

(10) Patent No.: US 8,037,111 B2
(45) Date of Patent: Oct. 11, 2011

(54) STORAGE SYSTEM AND A FILE LAYER MANAGEMENT METHOD

(75) Inventors: Shunya Tabata, Tokyo (JP); Nobuo Beniyama, Yokohama (JP); Hiroshi Nojima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 292 days.

(21) Appl. No.: 12/492,787

(22) Filed: Jun. 26, 2009

(65) Prior Publication Data
US 2010/0250627 A1    Sep. 30, 2010

(30) Foreign Application Priority Data

Mar. 31, 2009 (JP) .................. 2009-087858

(51) Int. Cl.
*G06F 7/00* (2006.01)
(52) U.S. Cl. ...................................... 707/812
(58) Field of Classification Search .................... 707/812
See application file for complete search history.

(56) References Cited

U.S. PATENT DOCUMENTS
7,355,806 B2    4/2008    Hakamata et al.

FOREIGN PATENT DOCUMENTS
JP    2000-293314 A    10/2000

*Primary Examiner* — Apu Mofiz
*Assistant Examiner* — Ajith Jacob
(74) *Attorney, Agent, or Firm* — Foley & Lardner LLP

(57) ABSTRACT

A file server holding tag information representative of file contents and an access frequency of each file calculates a tag rating from the access frequency of each file and calculates a file rating from the tag rating affixed to the file. It controls to place a file having a high calculated file rating on a higher transfer performance layer, and place a file having a low calculated file rating on a lower transfer performance layer. Rapid accesses can be handled quickly by placing in advance a file whose access is anticipated to be increased after interest is increased although an access frequency is still low, on a layer having a short response time and high throughput, and by maintaining a file whose access is anticipated to be increased because of increased interest although an access frequency is lowered, on a layer having a short response time and high throughput.

10 Claims, 11 Drawing Sheets

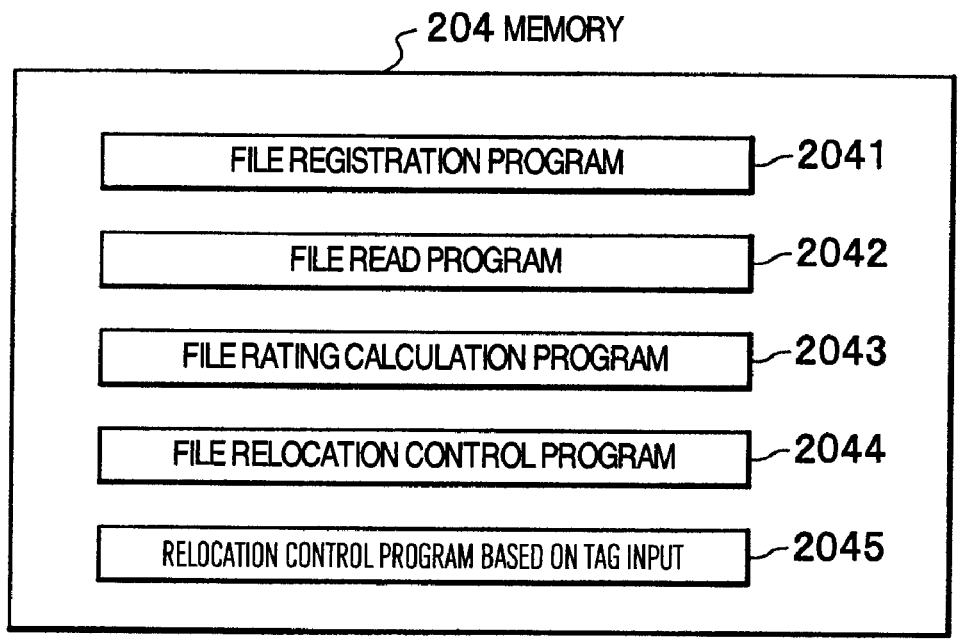
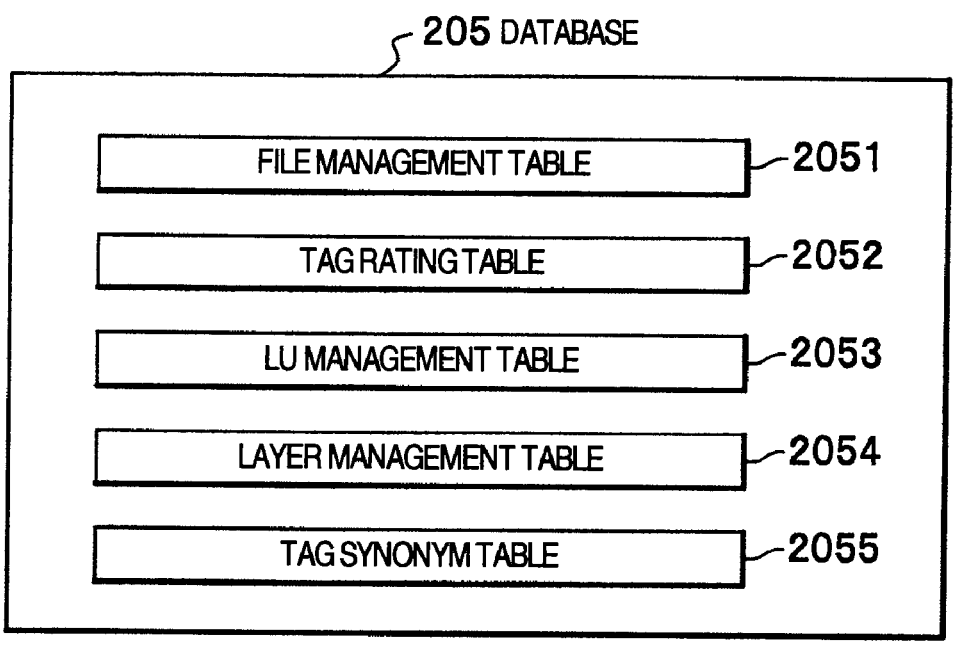

FIG.4

2051 FILE MANAGEMENT TABLE

| FILE PATH | REAL STORAGE PATH | CAPACITY | ACCESS COUNT/DAY | TAG NAME | RATING |
|---|---|---|---|---|---|
| FILE A | /hda/ file A | 100MB | 1000 | TAG 1<br>TAG 2 | 6000 |
| FILE B | /hdb/ file B | 200MB | 2000 | TAG 1<br>TAG 4 | 5000 |
| FILE C | /hdc/ file C | 100MB | 5000 | TAG 3 | 7000 |
| FILE D | /hdd/ file D | 300MB | 2000 | TAG 2<br>TAG 3 | 10000 |
| ⋮ | ⋮ | ⋮ | ⋮ | ⋮ | ⋮ |

2052 TAG RATING TABLE

| TAG NAME | RATING |
|---|---|
| TAG 1 | 3000 |
| TAG 2 | 3000 |
| TAG 3 | 7000 |
| TAG 4 | 2000 |
| ⋮ | ⋮ |

2053 LU MANAGEMENT TABLE

| LU NAME | CAPACITY | DEVICE NAME | BELONGING LAYER NAME |
|---------|----------|-------------|----------------------|
| LU1 | 100MB | /hda | LAYER A |
| LU2 | 200MB | /hdb | LAYER B |
| LU3 | 100MB | /hdc | LAYER B |
| LU4 | 300MB | /hdd | LAYER C |
| ⋮ | ⋮ | ⋮ | ⋮ |

FIG.7

2054 LAYER MANAGEMENT TABLE

| LAYER NAME | RATING UPPER LIMIT | RATING LOWER LIMIT |
|------------|--------------------|--------------------|
| LAYER A | — | 8000 |
| LAYER B | 8000 | 5000 |
| LAYER C | 5000 | — |
| ⋮ | ⋮ | ⋮ |

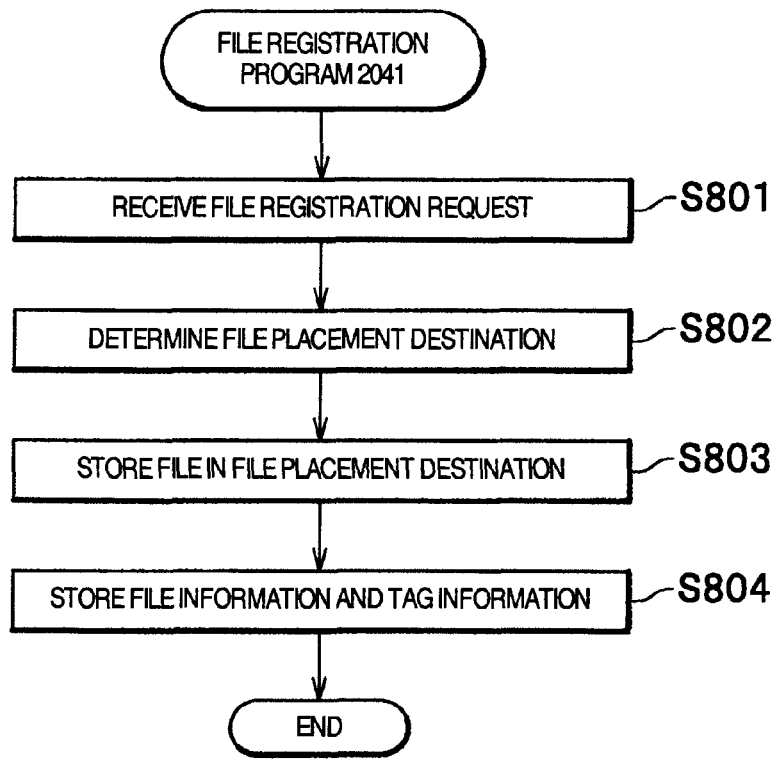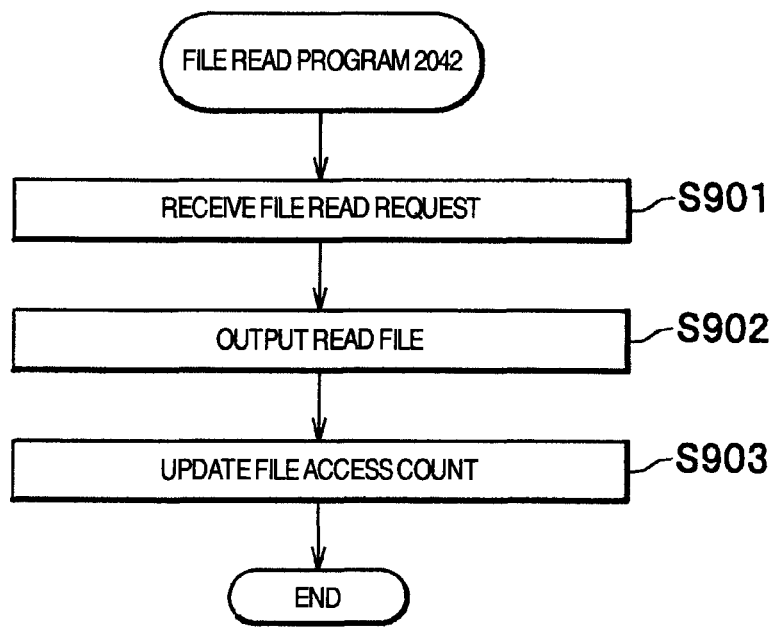

FIG.12

2051A FILE MANAGEMENT TABLE

| 401 | 402 | 403 | 404 | 405 | 408 | 406 |
|---|---|---|---|---|---|---|
| FILE PATH | REAL STORAGE PATH | CAPACITY | ACCESS COUNT/DAY | TAG NAME | RELEVANCE STRENGTH | RATING |
| FILE A | /hda/ fileA | 100MB | 1000 | TAG 1 | 1 | 4500 |
|  |  |  |  | TAG 2 | 2 |  |
| FILE B | /hdb/ fileB | 200MB | 2000 | TAG 1 | 2 | 4000 |
|  |  |  |  | TAG 4 | 1 |  |
| FILE C | /hdc/ fileC | 100MB | 5000 | TAG 3 | 1 | 6000 |
| FILE D | /hdd/ fileD | 300MB | 2000 | TAG 2 | 1 | 8500 |
|  |  |  |  | TAG 3 | 2 |  |
| ⋮ | ⋮ | ⋮ | ⋮ | ⋮ | ⋮ | ⋮ |

FIG.13

2052A TAG RATING TABLE

| 501 | 502 |
|---|---|
| TAG NAME | RATING |
| TAG 1 | 2000 |
| TAG 2 | 2500 |
| TAG 3 | 6000 |
| TAG 4 | 2000 |
| ⋮ | ⋮ |

FIG.14

2051B FILE MANAGEMENT TABLE

| FILE PATH | REAL STORAGE PATH | CAPACITY | ACCESS COUNT/DAY | TAG NAME | CONTENTS LENGTH | RATING |
|---|---|---|---|---|---|---|
| FILE A | /hda/ file A | 100MB | 1000 | TAG 1 | 100min | 40 |
|  |  |  |  | TAG 2 |  |  |
| FILE B | /hdb/ file B | 200MB | 2000 | TAG 1 | 200min | 30 |
|  |  |  |  | TAG 4 |  |  |
| FILE C | /hdc/ file C | 100MB | 5000 | TAG 3 | 50min | 110 |
| FILE D | /hdd/ file D | 300MB | 2000 | TAG 2 | 200min | 130 |
|  |  |  |  | TAG 3 |  |  |
| ⋮ | ⋮ | ⋮ | ⋮ | ⋮ | ⋮ | ⋮ |

FIG.15

2055 TAG SYNONYM TABLE

| TAG NAME | SYNONYM |
|---|---|
| TAG 1 | — |
| TAG 2 | TAG 3 |
| TAG 2 | TAG 4 |
| TAG 3 | TAG 2 |
| TAG 4 | TAG 2 |
| ⋮ | ⋮ |

FIG.16

2051C FILE MANAGEMENT TABLE

| FILE PATH (401) | REAL STORAGE PATH (402) | CAPACITY (403) | ACCESS COUNT/DAY (404) | TAG NAME (405) | RATING (406) |
|---|---|---|---|---|---|
| FILE A | /hda/ file A | 100MB | 1000 | TAG 1 | 13000 |
| | | | | TAG 2 | |
| FILE B | /hdb/ file B | 200MB | 2000 | TAG 1 | 8000 |
| | | | | TAG 4 | |
| FILE C | /hdc/ file C | 100MB | 5000 | TAG 3 | 8000 |
| FILE D | /hdd/ file D | 300MB | 2000 | TAG 2 | 18000 |
| | | | | TAG 3 | |
| ⋮ | ⋮ | ⋮ | ⋮ | ⋮ | ⋮ |

FIG.17

2052C TAG RATING TABLE

| TAG NAME (501) | RATING (502) |
|---|---|
| TAG 1 | 3000 |
| TAG 2 | 10000 |
| TAG 3 | 8000 |
| TAG 4 | 5000 |
| ⋮ | ⋮ |

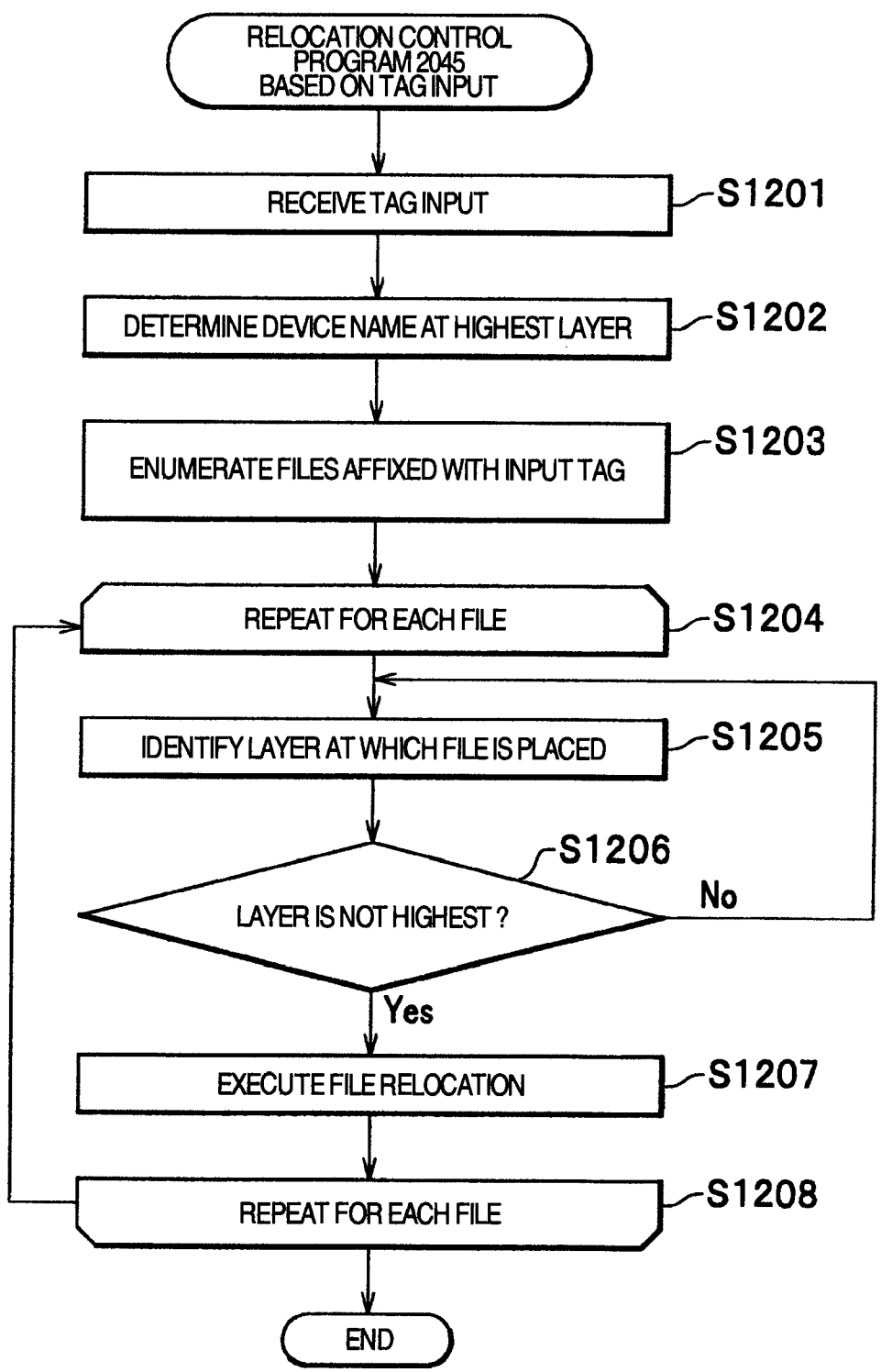

STORAGE SYSTEM AND A FILE LAYER MANAGEMENT METHOD

INCORPORATION BY REFERENCE

The present application claims priority from Japanese application JP2009-087858 filed on Mar. 31, 2009, the content of which is hereby incorporated by reference into this application.

BACKGROUND OF THE INVENTION

The present invention relates to a storage system for managing a level at which a file is stored in accordance with tag information representative of file contents and file access frequency information and a file layer management method, respectively in layer storage environment for file levels.

Recently, demands for online storage such as content depots are increasing as storages for reposition/distribution of digital contents. Layer storage environment for file levels has been paid attention, such as relocating files in accordance with a file access frequency for the purposes of storage optimization.

In response to high momentum for protection of the global environment, information technology industry also increases the efforts against reduction in consumption power of apparatus. There is therefore increasing interest to reduction in a consumption power of a storage apparatus. Introduction of MAID (Massive Array of Inactive Disks) technology is progressed which can suppress a consumption power of a storage apparatus through spindown/spinoff of disks loaded in the storage apparatus. For example, JP-A-2000-293314 Publication (corresponding to U.S. Pat. No. 7,355,806B2, Hakamata et al.) discloses a power supply control method of making a host computer control a power supply in accordance with an access frequency to a storage apparatus.

SUMMARY OF THE INVENTION

According to the technique disclosed in JP-A-2000-293314, the host computer controls a power supply in accordance with an access frequency to a storage apparatus. If an access frequency increases suddenly, the access is limited until a storage apparatus becomes active after the power supply is controlled. There arises therefore a problem that a sudden access increase cannot be coped with rapidly.

The present invention has been made to solve the above-described problem, and an object of the present invention is to provide a storage system capable of rapidly handling even a suddenly increased access frequency, and a file layer management method.

In order to achieve the above-described object, a file server for managing a storage system holds tag information representative of the contents of a file and an access frequency of each file, calculates a rating of each tag from an access frequency of each file, and calculates a rating of each file from the rating of a tag affixed to the file. The file server controls to move the file having a high rating to a layer having a high transfer performance, and to move the file having a low rating to a layer having a low transfer performance.

Rapid accesses can be handled quickly by placing in advance a file whose access is anticipated to be increased after interest is increased although an access frequency is still low, to a layer having a short response time and high throughput, and by maintaining a file whose access is anticipated to be increased because of increased interest although an access frequency is lowered, to a layer having a short response time and high throughput.

According to the present invention, it is possible to rapidly cope with even a suddenly increased access frequency.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram illustrating the structure of a memory on a file server.

FIG. 3 is a block diagram illustrating the structure of a database on the file server.

FIG. 4 is a diagram illustrating an example of the data structure of a file management table according to a first embodiment.

FIG. 5 is a diagram illustrating the data structure of a tag rating table according to the first embodiment.

FIG. 6 is a diagram illustrating an example of the data structure of an LU management table.

FIG. 7 is a diagram illustrating and example of the data structure of a layer movement table.

FIG. 8 is a flow chart illustrating a process to be executed by a file registration program.

FIG. 9 is a flow chart illustrating a process to be executed by a file read program.

FIG. 12 is a diagram illustrating an example of the data structure of the file management table according to a second embodiment.

FIG. 13 is a diagram illustrating an example of the data structure of the tag rating table according to the second embodiment.

FIG. 14 is a diagram illustrating an example of the data structure of the tag rating table according to a third embodiment.

FIG. 15 is a diagram illustrating an example of the data structure of a tag synonym table according to a fourth embodiment.

FIG. 16 is a diagram illustrating an example of the data structure of the file management table according to the fourth embodiment.

FIG. 17 is a diagram illustrating an example of the data structure of the tag rating table according to the fourth embodiment.

FIG. 18 is a flow chart illustrating a process to be executed by the relocation control program in accordance with a tag input, according to a fifth embodiment.

DESCRIPTION OF THE EMBODIMENTS

The modes for carrying out the present invention (hereinafter called embodiments) will now be described in detail with reference to the accompanying drawings.

First Embodiment

In the first embodiment, ratings of tag information affixed to files are performed in accordance with a file access frequency, and further ratings of files are performed in accordance with the ratings of tag information to relocate the files. Detailed description will now be made on a file rating method and the like. Although the "ratings" mean "classification", "evaluation" or the like, in this embodiment the "ratings" mean evaluation of a possibility that the file server can access a tag or file, and the evaluated value is used as an "evaluation value" in a rating 406 in FIG. 4 and a rating 502 in FIG. 5 as will be later described. Although "performing ratings" has a general meaning of "evaluating", in this embodiment it means "calculating an evaluation value".

(Structure of Storage System)

Figure 1:
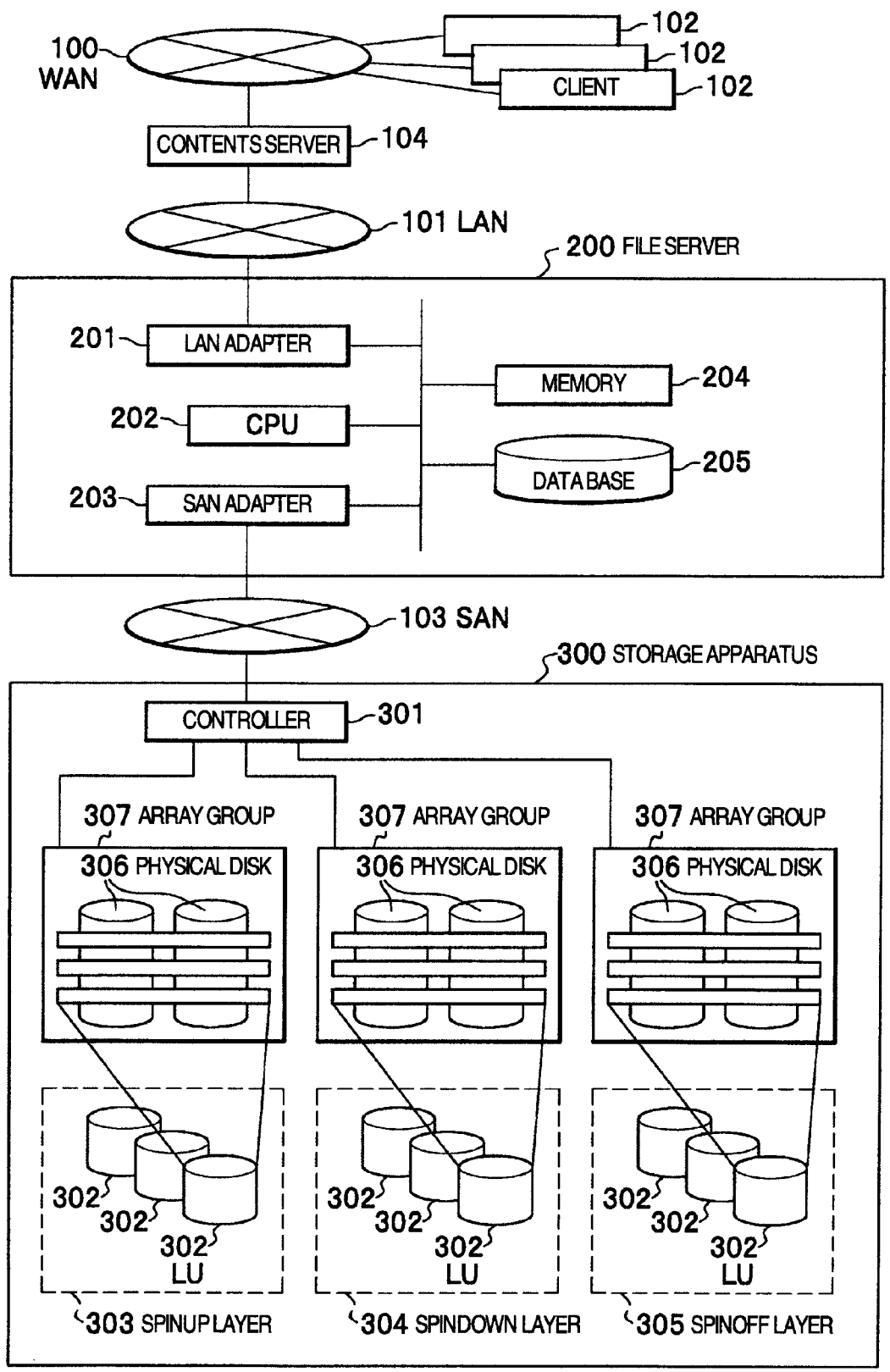
FIG. 1 is a diagram illustrating the structure of a storage system of an embodiment.

FIG. 1 is a diagram illustrating the structure of a storage system of the embodiment. The storage system is constituted of clients 102, a WAN 100, a contents server 104, a LAN 101, a file server 200, a SAN 103, and a storage apparatus 300. SAN stands for Storage Area Network, LAN stands for Local Area Network, and WAN stands for Wide Area Network.

(Storage Apparatus)

The storage apparatus 300 includes a controller 301, LU's 302, physical disks 306, and array groups 307. The controller 301 controls data input/output between the file server 200 and LU's 302. LU 302 stores data. One or a plurality of LU's are formed for each array group 307 constituted of one or a plurality of physical disks. The controller 301 logically controls LU's 302 as a spinup layer 303, a spindown layer 304 and a spinoff layer 305. LU stands for Logical Unit.

Spinup, spindown and spinoff indicate disk rotation states by the MAID technology. Spinup indicates a normal rotation state. Therefore, a normal response time and a normal throughput are provided. Spinoff indicates a rotation stop state for the purposes of power saving. It takes therefore a time to start spinup, and a longer response time is provided than the spinup state. Spindown indicates a lowered rotating speed state for the purposes of power saving. A response time and a throughput are provided taking intermediate values between spinup and spinoff. In this embodiment, a layer is defined by the disc rotation state by the MAID technology by way of example. Instead, the layer management may be conducted from a performance viewpoint such as a high performance layer and a low performance layer, a cost viewpoint such as a high cost layer and a low cost layer, a reliability viewpoint such as a high reliability layer and a low reliability layer.

(File Server)

The file server 200 includes a LAN adapter 201, a CPU 202, a SAN adapter 203, a memory 204 and a database 205. The file server 200 recognizes a storage area of the storage apparatus 300 as LU's 302 via SAN 103. The file server 200 has a SAN adapter 203, and is connected to SAN 103 via the SAN adapter 203. The file server 200 has a LAN adapter, and is also connected to LAN 101 via the LAN adapter 201.

The file server 200 is requested from the contents server 104 via LAN 101 to register a file, and records the requested file in LU 302 recognized as the storage area. CPU 202 executes various processes by running a program stored in the memory 204, and records data generated in each process in the database 205.

(Contents Server)

The contents server 104 discloses a file on the file server 200 to the clients 102 via WAN 100. Each client 102 registers a file in the file server 200 or reads a file on the file server 200, via the contents server 104.

(Structure of Memory)

FIG. 2 is a block diagram illustrating the memory on the file server. The memory 204 on the file server 200 stores: a file registration program 2041 (file registration means) (refer to FIG. 8); a file read program 2042 (file read means) (refer to FIG. 9); a file rating calculation program 2043 (file evaluation value calculation means) (refer to FIG. 10); a file relocation control program 2044 (file relocation control means) (refer to FIG. 11); and a relocation control program 2045 (relocation control means based on a tag input) (refer to FIG. 18), respectively to be executed by CPU 202. The file registration program 2041 performs a file registration process when a file registration request is issued from the contents server 104. The file read program 2042 performs a file read process when a file read request is issued from the contents server 104. The file rating calculation program 2043 calculate a file rating. The file relocation control program 2044 relocates a file among layers. The relocation control program 2045 based on a tag input relocates a file to be later described in the fifth embodiment.

(Structure of Database)

FIG. 3 is a block diagram illustrating the structure of the database on the filer server. The database 205 on the file server 200 includes: a file management table 2051 (file management information) (refer to FIG. 4); a tag rating table 2052 (tag evaluation value information) (refer to FIG. 5); an LU management table 2053 (refer to FIG. 6); a layer management table 2054 (refer to FIG. 7); and a tag synonym table 2055 to be described later in the fourth embodiment (refer to FIG. 15), respectively storing information.

Next, each table will be described.

FIG. 4 is a diagram illustrating an example of the data structure of the file management table of the first embodiment. The file management table 2051 illustrated in FIG. 4 stores information on files managed by the file server 200, the information including: a file path 401 to be used for the contents server 104 to access a file on the file server 200; a real storage path 402 representative of a path to the location where the file is really stored in the file server; a file capacity 403: an access count per day 404 (access information) indicating the number of accesses per day of the file; a tag name 405 representative of the name of a tag affixed to the file; and information on a rating 406 (evaluation value) representative of a rating value of the file. The file path 401 is a file name in a narrow sense, and a file path including a file name in a broad sense.

The tag name 405 is provided separately from the title of the file and explanation of the file, and is a keyword or the like to be used for making it easy to find the file. The tag name is registered in the contents server 104 when a file is uploaded from the client 102 to the contents server 104. For example, when files of moving images of the Olympics are uploaded, the tag name may be "swimming", "table tennis" "Olympics" or the like.

Description will be made further on the tag name. A file may be affixed with no tag name, or with a plurality of tag names 405. The tag name 405 affixed to the file is a character string representative of the contents of the file. The character string of the tag name may be freely defined and affixed by a user registering a file from the client 102, or may be defined and affixed by a file handling server such as file server 200 and contents server 104.

The rating 406 of a file indicates evaluation of the file, corresponds to interest degree to the file by users, and is a characteristic evaluation index of the embodiment.

FIG. 5 is a diagram illustrating an example of the data structure of the tag rating table of the first embodiment. In this embodiment, when a rating 406 of a file is calculated, a rating based on a tag name is also calculated. A tag rating table 2052 in FIG. 5 stores information on a tag name 501 and rating 502 (evaluation value), in accordance with tag information management by the file server 200. The tag rating 502 represents tag evaluation and interest degree to the tag by users.

FIG. 6 is a diagram illustrating an example of the data structure of the LU management table. An LU management table 2053 illustrated in FIG. 6 manages information on LU 302 (refer to FIG. 1) of the storage system disclosed by the file server 200, and stores: an LU name 601 of a disclosed LU 302; a capacity 602 of LU 302; a device name 603 for the filer server 200 to recognize LU 302; and a belonging layer name 604 representative of a layer name to which LU 302 belongs. Which LU 302 belongs to which layer is determined by the file server 200 in accordance with an object of the file. For example, if the layers illustrated in FIG. 1 are used, the spinup layer 303 is assigned to a layer A, the spindown layer 304 is assigned to a layer B, and the spinoff layer 305 is assigned to a layer C.

The real storage path 402 of the file management table 2051 illustrated in FIG. 4 is the device name 603 of the file coupled to the file path 401 of the file by "/". For example, if a file having the file name "file A" exists in the device having the device name "/hda", the real storage path 402 is "/hda/file A".

FIG. 7 is a diagram illustrating an example of the data structure of the layer management table. A layer management table 2054 illustrated in FIG. 7 holds information on the upper and lower limits in a range of ratings of files to be disposed at each layer, and stores information on a layer name 701, a rating upper limit 702 and a rating lower limit 703. A rating range of files to be disposed at each layer having the layer name 701 is represented by the rating upper limit 702 and rating lower limit 703.

When the file relocation control program 2044 (refer to FIG. 11) performs relocation, files in the rating range of each layer are disposed at this layer. A value "–" is stored in the rating upper limit 702 of the highest layer to indicate that the highest layer does not have the upper limit. Conversely, a value "–" is stored in the rating lower limit 703 of the lowest layer to indicate that the lowest layer does not have the lower limit. More specifically, a layer A is used for the files having the rating of "8000" or higher, and a layer B is used for the files having the rating of "5000" or higher and lower than "8000".

Although the ratings are not overlapped at each layer in the example of FIG. 7, the ratings may be overlapped at each layer. For example, although FIG. 7 illustrates an example of no overlap that the rating lower limit 703 of the layer A is "8000" and the rating upper limit 702 of the layer B is smaller than "8000", an overlap may exist by setting the rating lower limit 703 of the layer A to "8000" and setting the rating upper limit 702 of the layer smaller than "8500". If there is an overlap, a file may be disposed in any one of the layers. For example, if a file has a rating of "8200", this file may be disposed in any one of the layers A and B in the example described above. Specifically, the file server 200 identifies a layer in the storage apparatus 300 having an empty space, and may dispose the file in the layer having an empty space.

Next, the process to be executed by each program will be described. Although the process subject is CPU 202, description will be made by using each program as the process subject for the purposes of convenience.

(File Registration Program)

FIG. 8 is a flow chart illustrating a process to be executed by the file registration program. With reference to FIG. 8, description will be made on a file registration process to be executed by the file registration program 2041 when a file registration request is issued from the contents server 104. The file registration request is issued by the contents server 104 by supplying the file registration program with a file name, file data and a character string of a tag affixed to the file.

At Step S801, the file registration program 2041 receives a registration request for the file and the tag affixed to the file from the contents server 104. Input to the file registration program 2041 are the file name, file data, and the character string of the tag name affixed to the file. It is herein assumed that a file name "file E", and tags "tag E" and "tag F" affixed to the file are input.

At Step S802, the file registration program 2041 determines a file placement destination. A list of device names is acquired from the LU management table 2053, and a device name randomly selected from the device name list is used for identifying the placement destination device. It is herein assumed that a device name "/hdd" is selected as the device name of the placement destination device. Although the placement destination device is selected randomly, a process of calculating a file rating illustrated in FIG. 10 may be executed to select a placement destination layer and a placement destination device in accordance with the file rating.

At Step S803 the file registration program 2041 operates to store the file in the placement destination device. The file is stored in the placement destination "/hdd" determined at Step S802, as the file name "file E". From the file name "file E" input at Step S801 and the placement destination device name "/hdd" determined at Step S802, the real storage path is therefore "/hdd/file E".

At Step S804 the file registration program 2041 operates to store the file information and tag information. In accordance with the registered file information, values are stored in the file management table 2051 (refer to FIG. 4). In this case, the file name "file E" designated at the time of the file registration request is stored as the file name, the file access path "/hdd/file E" determined at Step S803 is stored in the real storage path 402, and a capacity of the file is stored in the capacity 403. The tag names "tag E" and "tag F" input at Step S801 are stored in the tag name 405. Initial values "0" are stored in the access count per day 404 and the rating 406. If the tag information input at Step S801 does not exist in the tag rating table 2052, values are stored in the table. In this case, the tag names "tag E" and tag "F" designated at the time of registration are registered in the tag name 405.

(File Read Program)

FIG. 9 is a flow chart illustrating a process to be executed by the file read program. With reference to FIG. 9, description will be made on a file read process to be executed when a file read request is received from the contents server 104.

At Step S901 the file read program 2042 receives a file read request from the contents server 104. A file path is input to the file read program 2042. It is assumed herein that a file path "file D" is input.

At Step S902 a read file is output. More specifically, the file read program 2042 determines a placement destination of the file to be read. The real storage path 402 is acquired from the file management table 2051 by searching the file having the file path input at Step S901. File data is read from the real storage path, and output to the contents server 104. In this case, data of the file D is read from the real storage path 402 "/hdd/file D" of the file path "file D", and output to the contents server 104.

At Step S903 the file read program 2042 updates the file access count. The access count of the file determined at Step S902 is read from the file management table 2051, and the incremented value is stored in the file management table 2051. In this case, the access count per day 404 of the file path "file E" input at Step S901 is acquired from the file management table 2051. In this case, a value "2000" of the access count per day 404 is acquired. The value "2000" is incremented, and "2001" is stored in the access count per day 404 of the file path "file D".

(File Rating Calculation Program)

Figure 10:
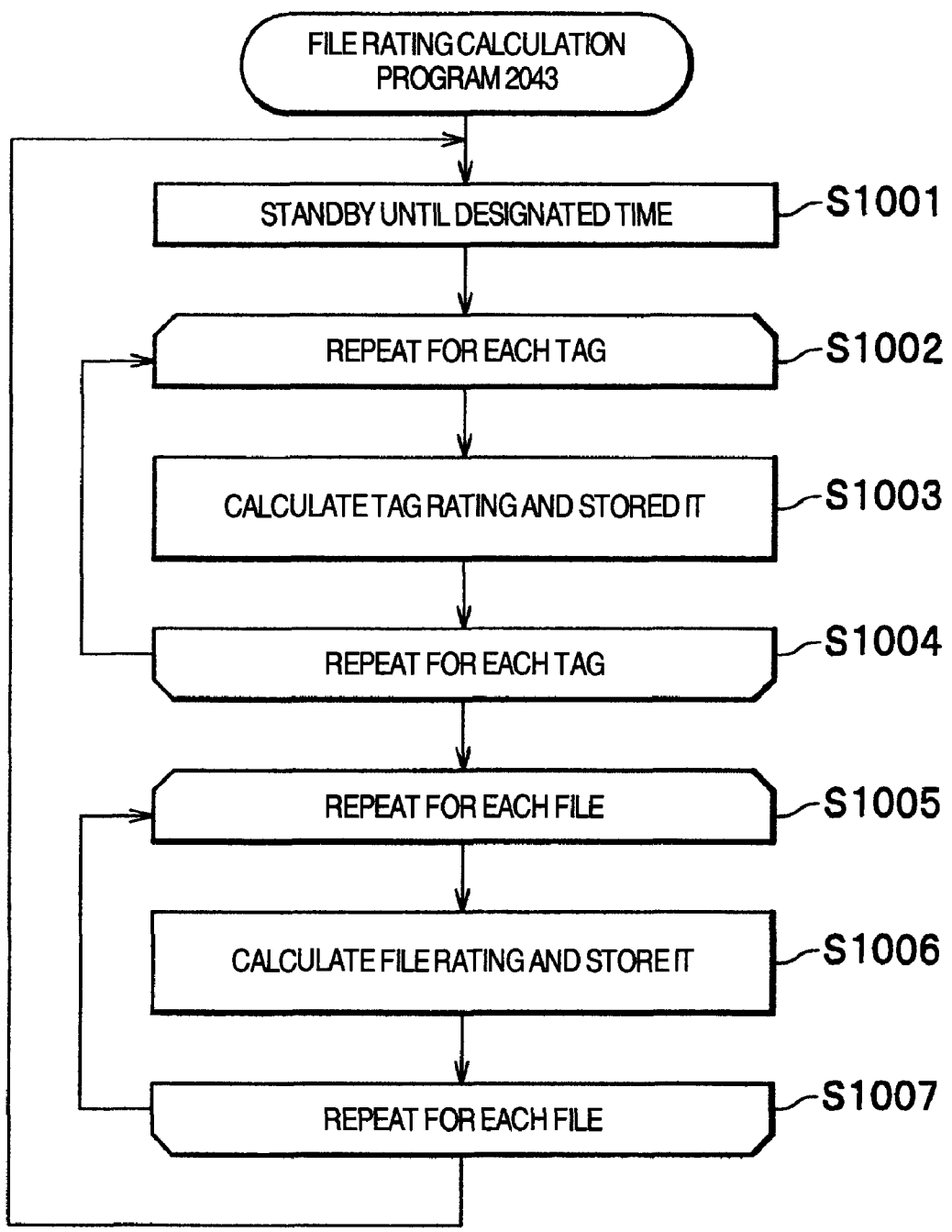
FIG. 10 is a flow chart illustrating a process to be executed by a file rating calculation program.

FIG. 10 is a flow chart illustrating a process to be executed by the file rating calculation program. With reference to FIG. 10, description will be made on a file rating calculation process to be executed by the file rating calculation program 2043. In this embodiment, although it is assumed that the file rating calculation process is executed routinely, a means may be provided for a user to instruct a start of the file rating calculation process.

Description will be first made on the importance of tag and file ratings of the embodiment. Rating calculations of the embodiment allow a tab to be rated from an access count of the file. Since the character string of a tag represents the contents of the file, it is possible to judge from tag ratings the contents of a file upon which accesses are concentrated.

For example, if there occurs an increase in accesses to a file affixed with tags of "swimming" and "Olympics", ratings for "swimming" and "Olympics" are raised. It is therefore possible to judge that accesses are presently concentrated upon the file having the contents of "swimming" and "Olympics". In the embodiment system, the same tag is allowed to be affixed to a plurality of files. Therefore, if there occurs an increase in accesses to a plurality of files affixed with the same tag, tag ratings are raised further. More precise tag ratings become possible by processing a number of files affixed with tags.

For example, if accesses to files affixed with a tag of "Olympics" increase at the same time when accesses to files affixed with tags of "swimming" and "Olympics" increase, it is possible to judge that accesses are concentrated upon the files having the contents of "Olympics".

The file rating calculation process illustrated in FIG. 10 allows file ratings to be derived from the above-described tag ratings. As described above, since each tag indicates the contents of the file affixed with the tag, it is possible to consider that files affixed with the same tag contain the same contents. It is therefore possible to judge that even a file having presently a low access frequency has a possibility that accesses are increased thereafter if the tag affixed to the file has a high rating.

For example, if there exists a file affixed with the tag of "Olympic" having the above-described high rating, a rating of this file is raised. It is therefore possible to judge that even if an access frequency to this file is low, there is a high possibility that accesses to this file increase.

Reverting to FIG. 10, at Step S1001 the file rating calculation program 2043 stands by until it becomes a designated time (predetermined timing) when the file rating process is executed. In this embodiment, ratings are performed at a constant interval by standing by until it becomes a time when ratings are performed. Instead, a means may be provided for a user to instruct a start of the file rating calculation process. When it becomes a predetermined timing, the flow advances to Step S1002.

At Step S1002 the file rating calculation program 2043 refers to the tag rating table 2052 (refer to FIG. 5), and repeats Step S1003 for each tag registered in the table. It is assumed herein that a tag "tag 1" registered in the tag rating table 2052 is selected.

At Step S1003 the file rating calculation program 2043 calculates a rating of each tag. A rating of the tag selected at S1002 is a sum of access counts per day 404 of files affixed with the tag. A calculated rating is stored in the rating 502 of the tag rating table 2052.

The rating calculation method for tags illustrated in FIG. 5 will be described more specifically. By referring to the file management table 2051, it can be understood that the files associated with the "tag 1" include "file A" and "file B". An access count per day 404 of a file path 401 "file A" affixed with the "tag 1" is "1000", and an access count per day 404 of a file path 401 "file B" is "2000". A rating of the "tag 1" is calculated as a sum of respective access counts. Namely, a value "3000" is stored in the rating 502 of the tag rating table 2052 as the rating of the "tag 1". Similarly, the rating 502 of the "tag 2" is "3000" which is a sum of "1000" and "2000", and the rating 502 of "tag 3" is "7000" which is a sum of "5000" and "2000".

After processes for all tags registered in the tag rating table 2052 are executed, at Step S1004 the file rating calculation program 2043 advances to Step S1005.

At Step S1005 the file rating calculation program 2043 refers to the tag management table 2051, and repeats Step S1006 for each file registered in the table. It is assumed herein that a file path 401 "file A" registered in the file management table 2051 is selected.

At Step S1006 the file rating calculation program 2043 calculates a rating of each file. By referring to the file management table 2051, tags affixed to the file selected at S1005 are acquired. Ratings of the affixed tags are acquired from the tag rating table 2052, and a sum of tag ratings is used as a rating of the file. A calculated rating is stored in the rating 406 of the file management table 2051.

The rating calculation method for files illustrated in FIG. 4 will be described more specifically. It can be understood from the tag name 405 that the tags associated with the "file A" include "tag 1" and "tag 2". By referring to FIG. 5, it can be understood that a rating of the "tag 1" is "3000" and a rating of the "tag 2" is "3000". A value of a sum of "6000" is stored in the rating 406 of the file management table 2051 as a rating of the "file A". Similarly, a rating of a "file B" is "5000" which is a sum of the rating "3000" of the "tag 1" and the rating "2000" of the "tag 4". A rating of a file C" is "7000" of a "tag 3". A rating of a "file D" is "10000" which is a sum of a rating "3000" of the tag 2" and a rating "7000" of the "tag 3".

Attention is to be paid to the following. A user reference degree represented by the access count per day 404 illustrated in FIG. 4 has an order of the file C, files B and D and file A as counted from a higher order. However, according to the rating 406 characteristic to the embodiment, the rating order is the file D, file C, file A and file B as counted from a higher order. This order difference may be ascribed to that the order determined by conventional access counts is based on present and past file reference indices, whereas the rating order is based on adding an expected future reference index. More specifically, a present increase in an access count of the "file C" associated with the "tag 3" means that the "file D" having a low access count at present has a high possibility of future access because the "file D" is also associated with the "tag 3".

As the "tag 3" is associated with another file, it is anticipated that a rating value becomes higher than that at present. Therefore, by referring to the tag rating table 2052 illustrated in FIG. 5, if a file has a tag name having a high rating value, the file may be raised to a higher level. This embodiment will be described layer with reference to FIG. 18.

Reverting to FIG. 10, after processes for all files registered in the file management table 2051 are executed, at Step S1007 the file rating calculation program 2043 returns to Step S1001.

(File Relocation Control Program)

Figure 11:
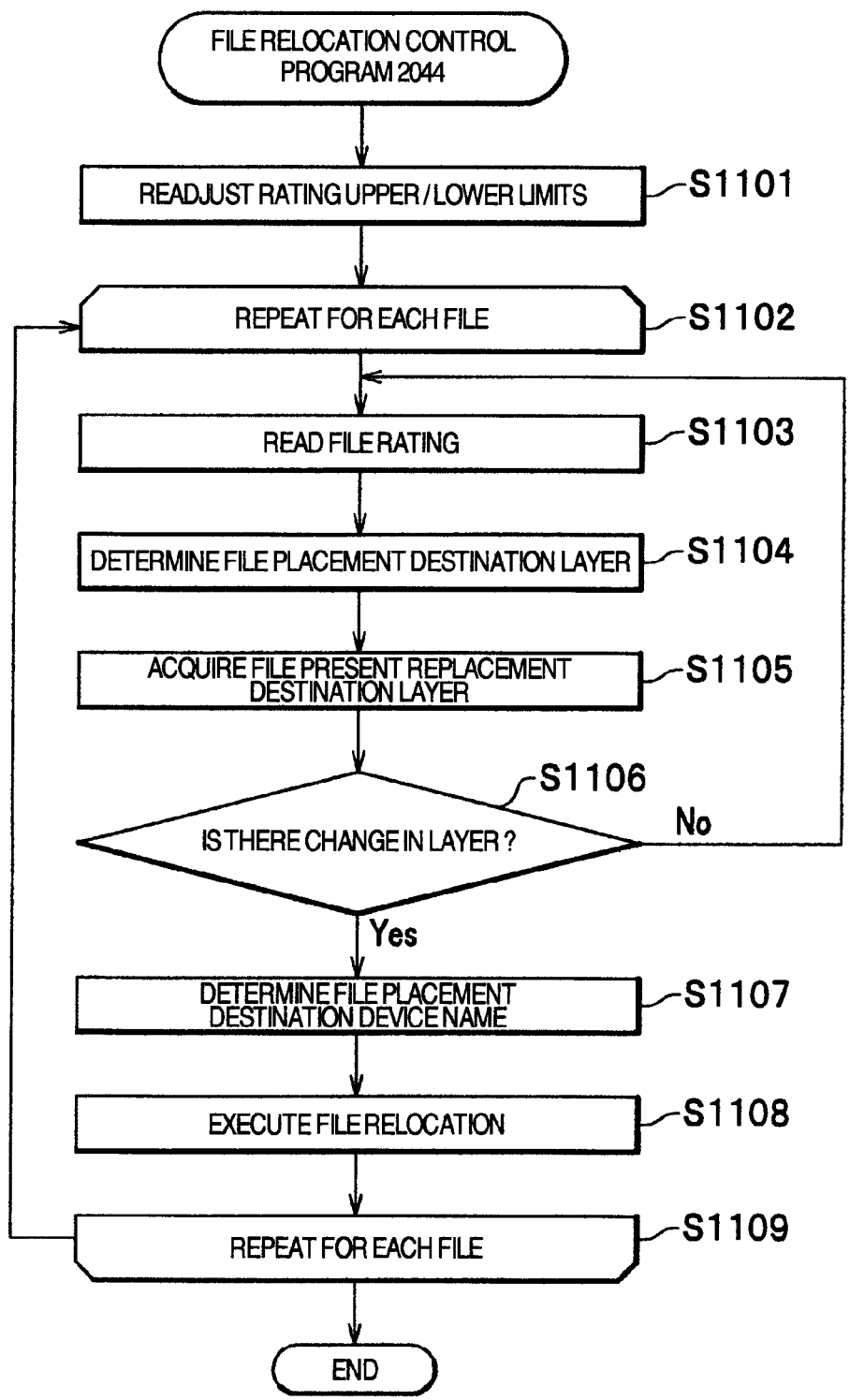
FIG. 11 is a flow chart illustrating a process to be executed by a file relocation control program.

FIG. 11 is a flow chart illustrating a process to be executed by the file relocation control program. With reference to FIG.

11, description will be made on a file relocation control process to be executed file relocation control program 2004.

At Step S1101 the file relocation control program 2004 readjusts an upper limit value and a lower limit value of ratings of files to be placed at each layer. The LU capacities 602 are acquired from the LU management table 2053 (refer to FIG. 6), and a sum of the capacities is obtained. The file capacities 403 are acquired from the file management table 2051 (refer to FIG. 4), and a sum of the capacities is obtained. A target ratio of a sum of the file capacities to a sum of the LU capacities is obtained.

LU belonging to the highest layer is selected, and by setting a use capacity of LU to "0", the following process is sequentially executed in the order of higher layer LU. A file having a highest rating is selected, and the following process is sequentially executed in the order of higher rating file. A ratio of a capacity used when the selected file is placed to the selected LU is obtained by adding the file capacity to the use capacity of LU. If the use capacity ratio does not exceed the target ratio, the next file is selected.

If the use capacity ratio exceeds the target ratio, a rating of the selected file is used as the lower limit rating of the layer to which LU belongs, to thereafter select the next LU. The above processes are repeated to determine the lower limit value of a rating at each layer. The lower limit value of the rating at each layer is used as the upper limit value of a rating at the next lower layer. The upper limit value and lower limit value of ratings are stored in the rating upper limit 702 and rating lower limit 703 of the layer management table 2054.

Description has been made above on a method of readjusting the upper limit value and lower limit value of a range of ratings of files placed at each layer. Without performing this method, a means may be provided for providing an interface for an administrator of the file server 200 to set the upper limit value and lower limit value of file ratings.

At Step S1102 the file relocation control program 2044 refers to the file management table 2051, and repeats Steps S1103 to S1108 for each registered file. It is herein assumed that a file path 401 "file A" registered in the file management table 2051 is selected. At Step S1103 a rating of the object file is read. The rating 406 "6000" of the file path "file A" selected at Step S1102 is read.

At Step S1104 the file relocation control program 2044 determines a layer in which the file rating is included between the upper limit value and lower limit value of the layer, as a placement destination layer of the object film. In this case, the layer of the placement destination is determined as the "layer B" because the rating of the file path "file A" read at Step S1103 is "6000" and the rating upper limit 702 and lower limit 703 of the "layer B" in the layer management table 2054 are "8000" and "5000", respectively.

At Step S1105 the file relocation control program 2044 acquires the present placement destination layer name of the object file. In this case, the placement device name "/hda" is acquired from the file real storage path 402 "/hda/file A", and the belonging layer name 604 of "layer A" of the device name "/hda" is acquired from the LU management table 2053.

At Step S1106 the file relocation control program 2044 judges, from the layer acquired at Step S1105 at which the object file is placed and the placement destination layer determined at Step S1104, whether there is a change in a file placement. If there is a change (Yes at Step S1106), the flow advances to Step S1107, whereas if there is no change (No at Step S1106), the flow returns to Step S1103. In this case, the flow advances to Step S1107 because the relocation destination layer "layer B" of the file path "file A" obtained at Step S1104 is different from the present placement layer "layer A" of the file A acquired at Step S1105.

At Step S1107 the file relocation control program 2044 determines a file placement destination device from the layer obtained at Step S1104. In this case, a device belonging to the placement destination layer "layer B" of "/hda/file A" obtained at Step S1104 is acquired from the device name 603 of the LU management table, and "/hdb" is determined as the placement destination device.

At Step S1108 the file relocation control program 2044 executes file relocation in accordance with the placement destination device obtained at Step S1107. In this case, the file "/hda/file A" selected at Step S1102 is relocated to the device name "/hdb" of the placement destination device determined at Step S1107, to thereby set "/hdb/file A". The real storage path 402 of the file management table 2051 is updated to "/hdb/file A".

After processes for all files registered in the file management table 2051 are performed, at Step S1109 the file relocation control program 2004 terminates the file relocation control process.

Summary of the First Embodiment

As described above, it is possible to move a file having a high rating to an upper layer, by rating a tag in accordance with a file access frequency and the tag affixed to the file, and rating the file in accordance with the affixed tag. By moving the file affixed with a tag having increased interest to a higher layer, it is possible to cope with an increase in file accesses. Conversely, even if accesses to a file at an upper layer reduce and if there is increasing interest to the affixed tag, the file is remained at the upper layer so that an increase in accesses to the file can be coped with.

Second Embodiment

In the second embodiment, a file is relocated by rating the file in accordance with a file access frequency, an affixed tag, and a correlation strength between the file and tag. In this embodiment, by incorporating the correlation strength between the file and affixed tag into ratings, it becomes possible to relocate a file by ratings with higher precision. The second embodiment is performed on the basis of the first embodiment. Description will be made mainly on different points from the first embodiment, including a file rating method and the like.

(Structure of Database)

In the second embodiment, of the tables used in the first embodiment, a file management table 2051A (refer to FIG. 12) is different from the file management table 2051 (refer to FIG. 4) of the first embodiment.

FIG. 12 is a diagram illustrating an example of the data structure of a file management table of the second embodiment. The file management table 2051A illustrated in FIG. 12 stores information same as in the first embodiment, and a relevance strength 408 representative of a relevance strength (correlation strength) between a file and tag.

More specifically, it is assumed in FIG. 12 that a file path "file B", tags "tag 1" and "tag 4" affixed to the file, and file correlation strengths "2" and "1" between the file and tag are input. The correlation strength between the file and tag may be represented by the input order of tags affixed to the file by a user on a file registration screen which the contents server 104 supplies to the clients 102. Other users referring to the file search a file often by using the tag as a key. It means therefore that the higher the correlation strength, i.e., the larger the value of the relevance strength 408, a higher the possibility of searching the file is.

(File Registration Program)

Description will be made on Step S801 different from the first embodiment in the processes illustrated in FIG. 8, and an added Step S805 (not shown). At Step S801 the file registration program 2041 receives a registration request for a file and an affixed tag from the contents server 104. Input to the file registration program 2041 are a file name, file data, a character string of a tag name affixed to the file, and a numerical value representative of a correlation strength between the file and tag.

At Step S805 the file registration program 2041 stores relevance strength information between the file and tag input at Step S801 in the relevance strength 408 of the file management table 2051A, in addition to the information same as in the first embodiment. In this case, correlation strengths "2" and "1" between the file and tags input at Step S801 are stored in the relevance strength 408 of the file management table 2051A as the correlation strengths of "tag 1" and "tag 2", respectively.

(File Rating Calculation Program)

Description will be made on Step S1003 different from the first embodiment in the processes illustrated in FIG. 10. At Step S1003 the file rating calculation program 2043 calculates a rating of each tag. The file management table 2051A illustrated in FIG. 12 is referred to, and a sum of values obtained by dividing access counts per day 404 by the relevance strengths 408 of a file to which the tag selected at Step S1002 was set is used as a rating of the tag. The obtained tag rating is stored in the rating 502 of the tag rating table 2052A illustrated in FIG. 13.

FIG. 13 is a diagram illustrating an example of the data structure of a tag rating table of the second embodiment. The tag rating table 2052A has the structure similar to that of the tag rating table 2052 of the first embodiment. A rating corresponding to the tag name will be described more specifically.

A "tag 1" is related to a "file A" and a file B" in the file management table 2051A. For the file path 401 "file A", a value obtained by dividing the access count per day 404 of "1000" by the relevance strength 408 of "1" is "1000". Similarly, for the "file B", a value obtained by dividing the access count of "2000" by the relevance strength of "2" is also "1000". A value of a sum "2000" is stored in the rating 502 of the tag rating table 2052 as a rating of the "tag 1". A value obtained by dividing the access count of "1000" of the "file A" by the relevance strength of "2" is "500", and a value obtained by dividing the access count of "2000" of a "file D" by the relevance strength of 1" is "2000". A sum "2500" is a rating of a "tag 2". Similarly, a value obtained by dividing the access count of "5000" of a "file C" by the relevance strength of "1" is "5000", and a value obtained by dividing the access count of "2000" of the "file D" by the relevance strength of 2" is "1000". A sum "6000" is a rating of a "tag 3". Similar calculations are made also for a "tag 4".

Reverting to FIG. 10, at Step S1006 a rating of the file is calculated by referring to the tag rating table 2052A. More specifically, for the "file A", "4500" is calculated as a sum of a rating value of "2000" of the "tag 1" and a rating value of "2500" of the "tag 2".

Attention is to be paid to the following. The ratings 406 characteristic to the second embodiment have an order of the "file D", "file C", "file A" and "file B" as counted from a higher order, which is not different from the first embodiment illustrated in FIG. 4. However, a difference between ratings of respective files becomes small. More specifically, a rating difference between the "file D" and "file B" is "5000" in the first embodiment, whereas it is "4500" in the second embodiment. It is understood that the relevance strength 408 is taken into consideration.

Summary of the Second Embodiment

As described above, since a tag rating is obtained by dividing a file access count by the relevance strength, a rating is obtained more precisely, and it becomes possible to place a file at a proper layer in accordance with the rating.

Third Embodiment

In the third embodiment, a file is relocated by rating the file in accordance with a file access frequency and a length of video contents. A file to be accessed by a client by streaming of reproducing during reading, such as a video file and a music file, has a possibility that the file is accessed a plurality of times until all file data is transmitted to the client, depending upon a file access implementation method by the contents server. In this embodiment, even in the case wherein an access frequency increases in accordance with a length of contents of a file such as a video file and a music file, the file can be rated precisely and the file is relocated in accordance with the rating. The third embodiment is performed on the basis of the first embodiment. Description will be made mainly on different points from the first embodiment, including a file rating method and the like. A file management table 2051B is different from the file management table 2051 of the first embodiment.

(Structure of Database)

FIG. 14 is a diagram illustrating an example of the data structure of a file management table of the third embodiment. The file management table 2051B illustrated in FIG. 14 stores information same as in the first embodiment, and a contents length 407 representative of length information on file contents. "min" stands for "minute".

(File Registration Program)

In FIG. 8, at Step S805 (not shown) after Step S804 contents length information is acquired and stored in the contents length 407 of the file management table 2051B, in addition to the information same as in the first embodiment.

(File Rating Calculation Program)

At Step S1003 illustrated in FIG. 10 the file rating calculation program 2043 calculates a rating of each tag. The file management table 2051B is referred to, a sum of values obtained by dividing access counts per day 404 by the contents lengths of a file to which the tag selected at Step S1002 was set is used as a rating of the tag. The obtained tag rating is stored in the rating 502 of the tag rating table 2052.

More specifically, a value obtained by dividing the access count per day 404 of "1000" of the file path "file A" affixed with a "tag 1" by the contents length 407 of "100" is "10", and a value obtained by dividing the access count per day 404 of "2000" of a file path "file B" affixed with the "tag 1" by the contents length 407 of "200" is "10". A sum of "20" is a rating of the "tag 1" and stored in the rating 502 of the tag rating table 2052. Similarly, a value obtained by dividing the access count of "1000" of the "file A" by the contents length of "100" is "10, and a value obtained by dividing the access count of "2000" of a "file D" by the contents length of "200" is "10". A sum of "20" is a rating of the "tag 2" and is stored in the rating 502 of the tag rating table 2052.

Reverting to FIG. 10, at Step S1006 a rating of the "file A" of "40" is calculated as a sum of a rating value of "20" of the "tag 1" and a rating value of "20" of the "tag 2".

Summary of the Third Embodiment

As described above, since a tag rating is obtained by dividing a file access count by the contents length, a rating of video contents or the like increasing the access count in proportion with the contents length is obtained more precisely, and it becomes possible to place a file at a proper layer in accordance with the rating.

Fourth Embodiment

In the fourth embodiment, a file is relocated by rating the file in accordance with a file access frequency, an affixed tag, and tag similarity. In this embodiment, files affixed with similar tags are rated equally, and the files are relocated in accordance with the rating. The fourth embodiment is performed on the basis of the first embodiment. Description will be made mainly on different points from the first embodiment, including a file rating method and the like. A tag synonym table 2055 used in the fourth embodiment will be described in detail.

(Structure of Database)

FIG. 15 is a diagram illustrating an example of the data structure of a synonym table of the fourth embodiment. The tag synonym table 2055 illustrated in FIG. 15 stores a tag name 1401 of a registered tag, and a synonym 1402 indicating a similar tag to the subject tag. If a tag has a plurality of synonyms, the synonyms are stored in a plurality of rows. In this case, tags "tag 3" and "tag 4" are stored as the synonym of a "tag 2". If a tag has no synonym, a value "−" is stored.

FIG. 16 is a diagram illustrating an example of the data structure of a file management table of the fourth embodiment. The file management table 2051C of the fourth embodiment has the same data structure as that of the file management table 2051 (refer to FIG. 4) of the first embodiment. Since a value of the rating 406 is calculated by referring to a tag rating table 2052C illustrated in FIG. 17, rating values of files are different.

FIG. 17 is a diagram illustrating an example of the data structure of a tag rating table of the fourth embodiment. The tag rating table 2052C of the fourth embodiment has the same data structure as that of the tag rating table 2052 of the first embodiment. Since a value of the rating 502 is calculated by referring to the tag name 405 and tag synonym table 2055, rating values of tags are different.

(File Rating Calculation Program)

At Step S1003 illustrated in FIG. 10 the file rating calculation program 2043 calculates a rating of each tag in accordance with tag similarity. A synonym of the tag selected at Step S1002 is acquired from the tag synonym table 2055. By referring to the file management table 2051C (refer to FIG. 16), a sum of access counts per day 404 of files set with the tag selected at Step S1002 and similar tags is used as a rating of the subject tag.

More specifically, a "tag 3" and a "tag 4" as the synonyms of a "tag 2" are acquired from the tag synonym table 2055. The file management table 2051C is referred to, and a sum of access counts per day 404 of "1000", "2000", "5000" and "2000" of files affixed with the "tag 2", "tag 3" and "tag 4" is calculated to obtain "10000" which is stored in the rating 502 of the tag rating table 2052C as a rating of the "tag 2".

Reverting to FIG. 10, at Step S1006 by referring to the tag rating table 2052C a rating of the "file A" of "13000" is calculated as a sum of a rating value of "3000" of the "tag 1" and a rating value of "10000" of the "tag 2".

Summary of the Fourth Embodiment

As described above, since a tag rating is obtained by using also access counts of tiles affixed with synonym tags, a rating of a file is raised as accesses to the file having similarity increase. It is therefore possible to cope with an access increase to a file having similarity.

Fifth Embodiment

In the fifth embodiment, a file is relocated in accordance with externally input tag information. In this embodiment, files affixed with tags designated by a higher level apparatus than the file server may be relocated at a higher layer. The fifth embodiment is performed on the basis of the first embodiment. Description will be made mainly on different points from the first embodiment, including a file rating method and the like.

(Relocation Control Program Based On Tag Input)

FIG. 18 is a flow chart illustrating a relocation control program based on a tag input according to the fifth embodiment. With reference to FIG. 18, description will be made on a relocation control process to be executed by a relocation control program 2045 based on a tag input, in accordance with a tag input. In accordance with a tag input from the contents server 104, the relocation control program 2045 relocates the file affixed with the tag at a higher layer.

At Step S1201, the relocation control program 2045 based on a tag input receives a tag input from the contents server 104. In this case, it is assumed that a tag "tag 3" is input.

At Step S1202 the relocation control program 2045 based on a tag input determines (identifies) a device name at the highest layer. By referring to the layer management table 2054, a "layer A" which contains a value "−" representative of the highest layer in the rating upper limit 702 is acquired, and a device name 603 "/hda" belonging to the "layer A" is identified in the LU management table 2053.

At Step S1203 the relocation control program 2045 based on a tag input enumerates (extracts) files affixed with the tag input at Step S1201. In this case, by referring to the file management table 2051, files of file paths "file C" and "file D" affixed with the tag "tag 3" input at Step S1201 are enumerated (extracted).

At Step S1204 the relocation control program 2045 based on a tag input repeats Steps S1205 to S1207 for each file enumerated (extracted) at Step S1203. In this case, it is assumed that a file path "file C" is selected from the files enumerated at Step S1203.

At Step S1205 the relocation control program 2045 based on a tag input identifies a layer at which the file selected at Step S1204 is placed. In this case, it is judged from the real storage path 402 "/hdc/file C" of the file selected at Step S1204 that the file C is placed in a device having a device name "/hdc", and it is identified from the LU management table 2053 that the device name 603 "/hdc" belongs to the belonging layer name 604 "layer B".

At Step S1206 the relocation control program 2045 based on a tag input judges whether the layer identified at Step S1205 is the highest layer, and if the layer is not the highest layer (Yes at Step S1206) the flow advances to Step S1207, whereas if the layer is the highest layer (No at Step S1206), the flow returns to Step S1205. In this case, since the "layer C" identified at Step S1205 is different from the highest layer "layer A" identified at Step S1202, it is judged that the "layer C" is not the highest layer, and the flow advances to Step S1207.

At Step S1207 the relocation control program 2045 based on a tag input executed relocation of the object file to the placement destination obtained at Step S1202. In this case, the file path "file C" selected at Step S1204 is relocated to the placement destination device "/hda" obtained at Step S1202 to set "hda/file C". The real storage path 402 of the file management table 2051 is updated to "/hda/file C".

After processes for all files enumerated at Step S1203 are executed, at Step S1208 the relocation control program 2045 based on a tag input terminates the file relocation control process.

In the fifth embodiment described above, it is possible to relocate files affixed with the tag designated by a higher level apparatus than the file server, in accordance with externally input tag information. As tag information input at Step S1201, a tag having a high rating may be extracted from the tag rating table 2052 (refer to FIG. 5). Upon reception of a tag having a high rating, the relocation control program 2045 based on a tag input executes relocation of the file at Step S1203 and following Steps.

Similarly, as tag information input at Step S1201, a tag having a high rating may be extracted from the tag rating table 2052A (refer to FIG. 13) or from the tag rating table 2052C (refer to FIG. 17).

Summary of the Fifth Embodiment

As described above, by inputting tag information from the outside of the file server 200 or from the tag rating table 2052, it becomes possible to place a file affixed with the designated tag on an upper layer. It is therefore possible, for example, to place a file deeply relevant to news in a news source on a higher layer.

According to the embodiment, the file server 200 holding tag information representative of file contents and an access frequency of each file calculates a tag rating from the access frequency of each file and calculates a file rating from the tag rating affixed to the file. It is therefore possible to place a file having a high calculated file rating on a higher transfer performance layer, and place a file having a low calculated file rating on a lower transfer performance layer. Rapid accesses can be handled quickly by placing in advance a file whose access is anticipated to be increased after interest is increased although an access frequency is still low, to a layer having a short response time and high throughput, and by maintaining a file whose access is anticipated to be increased because of increased interest although an access frequency is lowered, to a layer having a short response time and high throughput.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system comprising:
a storage apparatus for storing a file in a storage area managed by two or more layers;
a file server communicable with said storage apparatus via a network; and
a contents server for managing contents of said file, said contents server being communicable with said file server via a network,
wherein said file server comprises:
file registration means, responsive to reception of a registration request for said file from said contents server, for registering said file in said storage apparatus and storing a file name of said file, a tag name as information representative of the contents of said file and relevant to said file, and access information to said file in a memory as file management information;
file read means, responsive to reception of a read request for said file from said contents server, for reading said file and updating said access information to said file;
file evaluation value calculation means for calculating at a predetermined timing an evaluation value of each of said tag name contained in said file management information by referring to said access information, storing said evaluation value in said memory as tag evaluation information, calculating an evaluation value of said file for each file name in said file management information by referring to said tag evaluation value information, and registering said evaluation value in said file management information; and
relocation control means for determining a storage destination layer of said file in accordance with said evaluation value of said file, and performing relocation of said file if said determined storage destination layer of said file is a storage destination layer different from a present storage destination layer.

2. The storage system according to claim 1, wherein:
said file registration means registers a relevance strength representative of a correlation strength between said tag name and said file, in said file management information; and
said file evaluation value calculation means calculates said evaluation value of each of said tag name by referring to said relevance strength and said access information and storing said evaluation value of each of said tag name in said tag evaluation value information.

3. The storage system according to claim 1, wherein:
said file registration means registers information representative of a length of the contents of said file in said file management information; and
said file evaluation value calculation means calculates said evaluation value of each of said tag name by referring to said information representative of the length of said contents and said access information.

4. The storage system according to claim 1, wherein:
said memory stores tag synonym information storing a tag name similar to said tag name; and
said file evaluation value calculation means calculates said evaluation value of each of said tag name by referring to said access information of said tag name and said access information of said similar tag name.

5. The storage system according to claim 1, wherein said file server further comprises relocation control means based on a tag input, responsive to reception of said tag name, for extracting a file affixed with said received tag name from said file management information, and relocates said extracted file to an upper layer.

6. A file layer management method for a storage system comprising: a storage apparatus for storing a file in a storage area managed by two or more layers; a file server communicable with said storage apparatus via a network; and a contents server for managing contents of said file, said contents server being communicable with said file server via a network, said file server managing said layer at which said file is stored, in accordance with an access state by said contents server, the file layer management method comprising:
a file registration step, responsive to reception of a registration request for said file from said contents server, of registering said file in said storage apparatus and storing a file name of said file, a tag name as information representative of the contents of said file and relevant to said file, and access information to said file in a memory as file management information;

a file read step, responsive to reception of a read request for said file from said contents server, for reading said file and updating said access information to said file;

a file evaluation value calculation step of calculating at a predetermined timing an evaluation value of each of said tag name contained in said file management information by referring to said access information, storing said evaluation value in said memory as tag evaluation information, calculating an evaluation value of said file for each file name in said file management information by referring to said tag evaluation value information, and registering said evaluation value in said file management information; and a relocation control step of determining a storage destination layer of said file in accordance with said evaluation value of said file, and performing relocation of said file if said determined storage destination layer of said file is a storage destination layer different from a present storage destination layer.

7. The file layer management method according to claim 6, wherein:

said file registration step registers a relevance strength representative of a correlation strength between said tag name and said file, in said file management information; and said file evaluation value calculation step calculates said evaluation value of each of said tag name by referring to said relevance strength and said access information and storing said evaluation value of each of said tag name in said tag evaluation value information.

8. The file layer management method according to claim 6, wherein:

said file registration step registers information representative of a length of the contents of said file in said file management information; and said file evaluation value calculation step calculates said evaluation value of each of said tag name by referring to said information representative of the length of said contents and said access information.

9. The file layer management method according to claim 6, wherein:

said memory stores tag synonym information storing a tag name similar to said tag name; and said file evaluation value calculation step calculates said evaluation value of each of said tag name by referring to said access information of said tag name and said access information of said similar tag name.

10. The file layer management method according to claim 6, wherein said file server further comprises a relocation control step based on a tag input, responsive to reception of said tag name, of extracting a file affixed with said received tag name from said file management information, and relocates said extracted file to an upper layer.

* * * * *